United States Patent [19]

Robertson

[11] Patent Number: 5,767,393
[45] Date of Patent: Jun. 16, 1998

[54] APPARATUS AND METHOD FOR DETECTING LEAKS IN TANKS

[75] Inventor: Michael O. Robertson, Hurt, Va.

[73] Assignee: McDermott Technology, Inc., New Orleans, La.

[21] Appl. No.: 813,422

[22] Filed: Mar. 10, 1997

[51] Int. Cl.$^6$ .................................... G01M 3/04
[52] U.S. Cl. .......................... 73/49.2; 73/40.5 A
[58] Field of Search .................. 73/40.5 A, 592, 73/49.2, 587, 801

[56] References Cited

U.S. PATENT DOCUMENTS

| | | | |
|---|---|---|---|
| 1,886,914 | 11/1932 | Slichter | 73/592 |
| 2,008,934 | 7/1935 | Smith | 73/40.5 A |
| 3,028,450 | 4/1962 | Manning | 73/592 |
| 3,838,593 | 10/1974 | Thompson | 73/40.5 A |
| 4,176,543 | 12/1979 | Nolte et al. | 73/40.5 A |
| 4,462,249 | 7/1984 | Adams | 73/40.5 A |
| 4,852,054 | 7/1989 | Mastandrea | 364/509 |
| 5,295,391 | 3/1994 | Mastandrea et al. | 73/49.2 |
| 5,341,670 | 8/1994 | Brook et al. | 73/40.5 A |

*Primary Examiner*—Michael Brock
*Attorney, Agent, or Firm*—Robert J. Edwards; Robert P. Bennett; Eric Marich

[57] ABSTRACT

An apparatus for detecting a leak in the storage tank which includes a transducer for detecting and converting a mechanical wave into an electrical signal, a support tube having an upper end extending outside of the tank and a lower end extending inside the tank into the fluid medium. The transducer is affixed to the lower end of the support tube. A signal processing unit for processing the electrical signal, and electrical cable for transmitting the electrical signal from the transducer to the signal processing unit is also present. A method of using the apparatus is also provided.

6 Claims, 2 Drawing Sheets

APPARATUS AND METHOD FOR DETECTING LEAKS IN TANKS

BACKGROUND OF THE INVENTION

1. Field of the Invention

The apparatus and method of the present invention relates in general to leak detection of a fluid from a storage tank, and in particular, use of a transducer to detect and convert a mechanical, fluid-borne sound wave propagating from a leak site into an electrical signal which is then compared to an electrical signal detected in a non-leak environment.

2. Description of the Related Art

Over the past decade, the United States has become increasingly aware and concerned about the potential for environmental harm resulting from the release of hazardous substances into the ground as a result of leaking storage tanks. Underground storage tanks are believed to pose the greatest threat since they are hidden from view and leaking conditions can persist without immediate detection. The United States Environmental Protection Agency has estimated that upwards to 15% of the roughly 2 million buried storage tanks in the United States pose a threat of leaking. As a result, regulations have been put in place to require periodic and routine inspections of underground storage tanks containing petroleum and hydrocarbons to insure their integrity and guarantee safety for the underground water supply.

As a result of this mandate, extensive efforts have been expended on developing adequate inspection techniques to determine whether buried tanks are leaking. Several applications have emerged. One of the most common is the volumetric technique where various instruments are utilized to measure the liquid level in the buried tanks over a specified period of time. Although this technique has yielded fairly good results, it lacks sensitivity to small leaks and is affected by environmental conditions. It requires either a very detailed inventory control or the tank to be out of service for a specified time.

A second technique used to detect leaks in underground storage tanks utilizes a tracer gas in the tank, and detects the seepage of the gas through the leak site then through the soil to the surface. This technique requires the system to be shut down and evacuated prior to inspection. Difficulty is also encountered where concrete or other forms of pavement cover the soil surface requiring excavation.

The present invention offers several notable advantages over the prior art. The present invention utilizes a submersed acoustic emission transducer to detect mechanical sound waves propagating through the fluid of the storage tank as result of a leak. The present invention provides for in-service inspections and alleviates the necessity of detailed inventory control. Further, the present invention is accurate and highly sensitive in detecting leaks. Finally, it provides for rapid inspections and does not require any excavation.

SUMMARY OF THE INVENTION

It is an object of the present invention to provide an apparatus and method for improving the detection of leaks from or into a storage tank.

It is further an object of the invention to provide an apparatus for detecting leaks in a storage tank in an accurate, highly sensitive and rapid manner without the necessity of taking the tank out of service and/or excavation.

Accordingly, an apparatus and method is provided wherein a transducer for detecting and converting a mechanical wave into an electrical wave is submersed within the fluid of a tank. The transducer is affixed to a lower end of a support tube which extends into the fluid. After the detection and conversion of the mechanical wave into an electrical signal, the electrical signal is transmitted through an electric cable to a signal processing unit which is located outside of the tank.

Leak versus non-leak conditions can be inferred through signal processing by comparing the signal energy of the given tank to be inspected to a non-leaking tank. An alternate method compares signal strength for different head pressures derived from adding compressed air above the fluid level. Non-leak conditions would yield the same signal strength for all pressures. Leaking conditions will yield higher signal strengths for increasing pressures since leak flow rates will be directly proportional to head pressure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
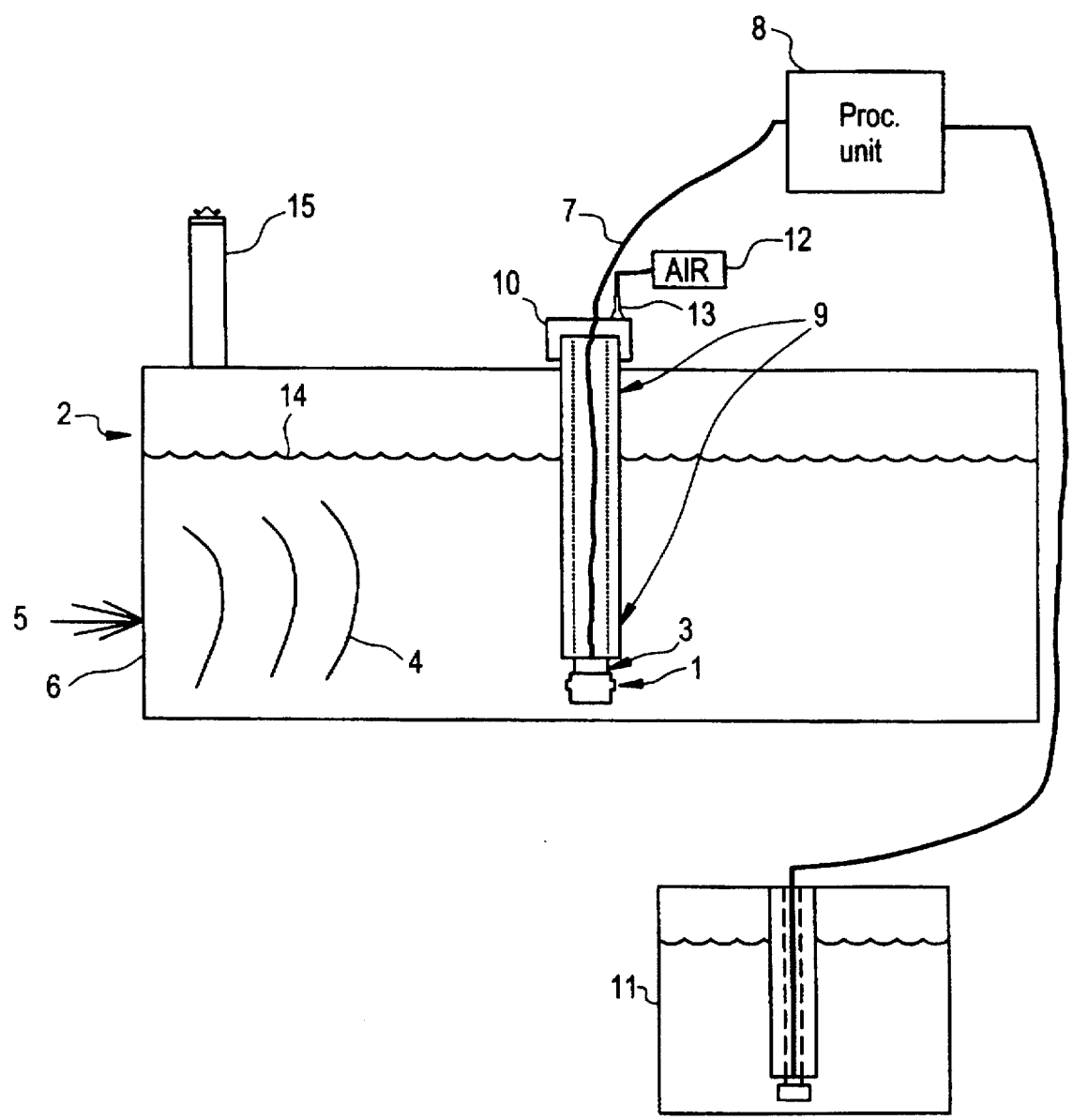
FIG. 1 is a schematic diagram of the present invention comprising the transducer, support tube, electric cable and signal processing unit.

Referring now to the drawings generally, and in particular to FIG. 1, an acoustic emission transducer 1 of the invention is submersed into the liquid of a storage tank 2. The transducer 1 is affixed to the lower end of a support tube 3. The upper end of the support tube 3 extends outside of the tank 2.

The transducer 1 detects a mechanical sound wave 4 which propagates from a leak site 5 in the tank wall 6. Upon detecting the mechanical sound wave 4, the transducer 1 converts the wave 4 into an electrical signal. An electric cable 7 transmits the electrical signal from the transducer 1 to a signal processing unit 8 which measures the energy of the signal.

In another embodiment, the support tube 3 is affixed within a tank fill tube 9. The support tube 3 is sealed to the tank fill tube 9 by a cap 10 which is affixed to the top end of the tank fill tube 9.

In order to determine the existence of a leak, the transducer 1 is submersed within a fluid contained in a non-leak tank 11 having the same dimensions and fluid as in tank 2. The transducer 1 detects any mechanical wave 4 in the non-leak tank and converts the wave 4 into an electrical signal which is transmitted to the signal processing unit 8 to determine the signal energy. The signal energy detected in the tank 2 should be greater than the signal energy detected in the non-leak tank 11 if a leak exists in the tank 2. It should be noted that nonleak tank 11 and tank 2 need not be tested simultaneously. The electrical signal energy valve for non-leak tank 11 can be determined and stored well in advance of testing tank 2, and the test results of each tank may subsequently be compared to indicate leak versus no leak conditions.

In a further embodiment of the invention, compressed air 12 is injected through an air valve stem 13 above the fluid level 14 of the tank 2. The injection of air 12 increases the head pressure which, in turn, increases the leak rate for any existing leaks. Several benefits accrue from adding air pressure, including the verification of the existence of leaks as well as providing increased sensitivity to smaller leaks. Non-leak conditions should yield the same signal energies for all pressures. A leak condition is indicated if the acoustic signal energy increases proportionally with increases in tank pressure (i.e., signal energy from a pressurized leaking tank is greater than the signal energy detected from the same non-pressurized tank). This is due to the fact that increased head pressure increases leak rates for any existing leaks generating increased acoustic sound wave energy in the fluid medium.

In a further embodiment of the invention, a vent tube 15 of the tank 2 may be plugged in order to create increased head pressure and thus, higher sensitivity in detecting leaks. Vent tube plugging is required for any embodiment of the invention where head pressure is elevated through addition of compressed air.

Figure 2:
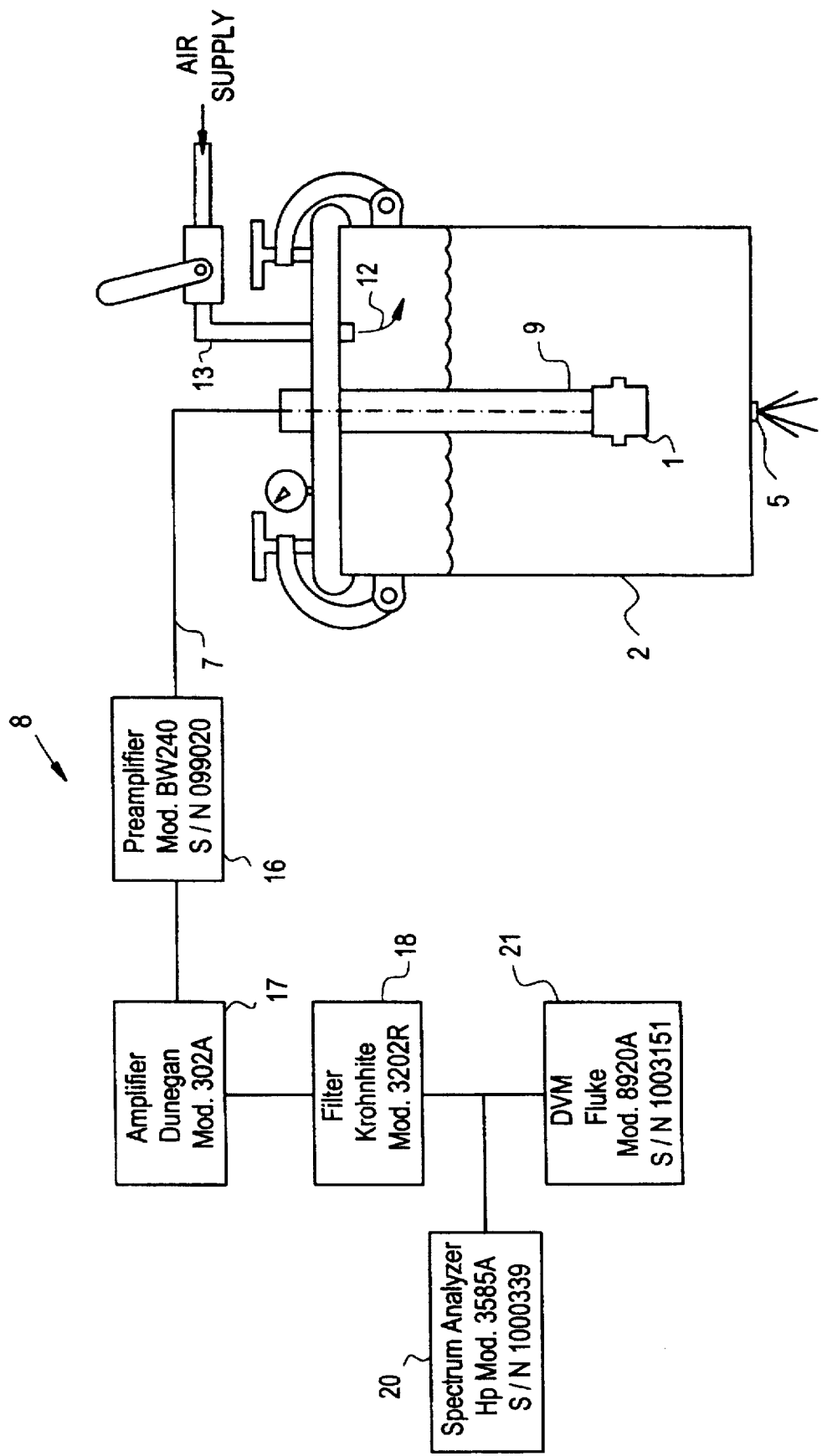
FIG. 2 is a schematic of the present invention further comprising an amplifier and filter.

Referring now to FIG. 2, the electric signal is amplified in pre-amp and amplification stages 16, 17 and filtered at 18 prior to signal processing to provide for optimized sensitivity towards the detection of leaks.

The signal is subjected to spectrum analysis using a known spectrum analyzer 20. This equipment is utilized to characterize the signal as a signal caused by noise from a leak as opposed to other types of noise which might be picked up by the acoustic transducer 1. This characterization aides in the selection of filtering values for the signal filter 18 which in turn increases overall signal-to-noise ratios of voltage values derived from the volt meter 21. Voltage output from the volt meter 21 is utilized as the primary indicator of leaks once the system is optimized (i.e., increased air pressures will yield increased voltage readings for a leaking tank). According to the invention, the analyzed signal will have increased voltage amplitude after the tank is pressured, due to an increase of sound which in turn is caused by increased leakage.

Although the specification discloses an underground tank, the invention may also apply to an above-ground tank. Underground tanks are chosen since they are most difficult to detect leaks within due to inaccessibility. The current invention allows for leak detection through the tank fill tube and requires no excavation.

While a specific embodiment of the invention has been shown and described in detail to illustrate the application of the principals of the invention, it will be understood that the invention may be embodied otherwise without departing from such principals.

What is claimed:

1. An apparatus for detecting a leak of fluid from a storage tank, the apparatus comprising:
    a transducer for detecting and converting a fluid-borne mechanical sound wave into an electrical signal having an amplitude representative of the sound wave's acoustic energy;
    pressurization means connected to the storage tank for pressurizing the storage tank to different head pressures;
    a support tube having an upper end extending outside of the tank and a lower end extending inside the tank, the transducer being affixed to the lower end;
    a signal processing unit for processing the electrical signal, the signal processing unit being outside of the tank, and including means for measuring differences in the amplitude of the electrical signal at different head pressures, acoustic signal energy detected from a pressurized leaking tank being greater than the acoustic signal energy detected from the same non-pressurized tank, whereby an increased amplitude of the electrical signal at an increased head pressure is caused by a leak in the tank; and
    an electric cable for transmitting the electrical signal from the transducer to the signal processing unit.

2. The apparatus as claimed in claim 1, wherein the support tube is affixed to and situated within a tank fill tube, the tank fill tube having a top end extending outside of the tank and a bottom end extending inside the tank.

3. The apparatus as claimed in claim 2, wherein the support tube is sealed to the tank fill tube by a cap, the cap being affixed to the top end of the tank fill tube.

4. The apparatus as claimed in claim 1, further comprising an amplifier for amplifying the electrical signal, said amplifier being outside the tank and connected to the electric cable on one of its ends and the signal processing unit on its other end by a second electric cable.

5. The apparatus as claimed in claim 4, further comprising a filter for filtering the electrical signal, said filter being outside the tank and connected to the amplifier on one of its ends by the second electric cable and the signal processing unit on its other end by a third electric cable.

6. A method of detecting a leak of fluid from or into a storage tank, comprising:
    detecting a first mechanical sound wave in the fluid;
    converting the first mechanical sound wave into a first electrical signal;
    plugging a vent tube of the storage tank in order to maintain pressure in the tank;
    adding compressed gas above the fluid level of the tank to pressurize the tank to an increased head pressure;
    detecting a second mechanical sound wave in the fluid;
    converting the second mechanical sound wave into a second electrical signal;
    transmitting the first electrical signal and the second electrical signal from inside the tank to outside of the tank;
    processing the first electrical signal and the second electrical signal; and
    comparing an amplitude of the first electrical signal with an amplitude of the second electrical signal, the presence of a leak being indicated when the amplitude of the second electrical signal is greater than the amplitude of the first electrical signal.

* * * * *